US012562365B2

(12) United States Patent
Fan et al.

(10) Patent No.: US 12,562,365 B2
(45) Date of Patent: Feb. 24, 2026

(54) BLENDED TERNARY POSITIVE-ELECTRODE MATERIAL, PREPARATION METHOD THEREOF AND LITHIUM ION BATTERY

(71) Applicant: YIBIN LIBODE NEW MATERIAL CO., LTD, Yibin (CN)

(72) Inventors: Weifeng Fan, Yibin (CN); Ping Zhang, Yibin (CN); Shilin Hou, Yibin (CN); Bin Zhang, Yibin (CN); Cheng Li, Yibin (CN); Changwang Hao, Yibin (CN); Zhengqiang Wang, Yibin (CN)

(73) Assignee: YIBIN LIBODE NEW MATERIAL CO., LTD, Yibin (CN)

( * ) Notice: Subject to any disclaimer, the term of this patent is extended or adjusted under 35 U.S.C. 154(b) by 537 days.

(21) Appl. No.: 18/304,055

(22) Filed: Apr. 20, 2023

(65) Prior Publication Data

US 2024/0120460 A1      Apr. 11, 2024

(30) Foreign Application Priority Data

Oct. 11, 2022      (CN) .......................... 202211237684.8

(51) Int. Cl.
| | |
|---|---|
| *H01M 4/525* | (2010.01) |
| *H01M 4/04* | (2006.01) |
| *H01M 4/505* | (2010.01) |
| *H01M 10/0525* | (2010.01) |
| *H01M 4/02* | (2006.01) |

(52) U.S. Cl.
CPC ......... *H01M 4/0471* (2013.01); *H01M 4/505* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2017/0107117 A1      4/2017   Takemoto et al.

FOREIGN PATENT DOCUMENTS

| | | |
|---|---|---|
| CN | 110970599 A | 4/2020 |
| CN | 112390296 A | 2/2021 |
| CN | 114349068 A | 4/2022 |
| CN | 114538532 A | 5/2022 |
| JP | 2010176973 A | 8/2010 |
| JP | 2013131298 A | 7/2013 |
| JP | 2018088404 A | 6/2018 |
| KR | 20190133594 A | 12/2019 |
| KR | 20200050747 A | 5/2020 |

OTHER PUBLICATIONS

Grant Notification of the prior Chinese application No. 202211237684.8 by the China Patent Office dated Dec. 13, 2022, together with English translation.
Search Report by the China Patent Office of the prior Chinese patent application, Oct. 21, 2022.

*Primary Examiner* — Carlos Barcena
(74) *Attorney, Agent, or Firm* — Platinum Intellectual Property

(57) ABSTRACT

The present disclosure discloses a blended ternary positive-electrode material, a preparation method thereof and a lithium ion battery, and relates to the field of lithium battery technologies. A temperature-sensitive precursor type material is taken as a raw material, a large-particle precursor, a small-particle precursor and lithium sources are presintered to obtain a first presintered material and a second presintered material, presintered materials and binders are then mixed, compacted and punctured to obtain a first to-be-sintered material block and a second to-be-sintered material block, the first to-be-sintered material block and the second to-be-sintered material block are loaded into a sagger together for primary sintering, and using a periphery-center regional mode or an upper-lower-layer distribution mode, the first presintered material is distributed at a periphery or an upper layer, and the second presintered material is distributed at a center or a lower layer.

13 Claims, 2 Drawing Sheets

BLENDED TERNARY POSITIVE-ELECTRODE MATERIAL, PREPARATION METHOD THEREOF AND LITHIUM ION BATTERY

CROSS-REFERENCE TO RELATED APPLICATION

The present disclosure claims the priority to the Chinese patent application with the filing No. 2022112376848, filed on Oct. 11, 2022 with the China National Intellectual Property Administration, and entitled "BLENDED TERNARY POSITIVE-ELECTRODE MATERIAL, PREPARATION METHOD THEREOF AND LITHIUM ION BATTERY", the contents of which are incorporated by reference herein in entirety.

TECHNICAL FIELD

The present disclosure relates to the field of lithium battery technologies, and particularly to a blended ternary positive-electrode material, a preparation method thereof and a lithium ion battery.

BACKGROUND ART

In recent years, with a development of new energy industries, a technology of doping large particles and small particles for a positive-electrode material is gradually applied and popularized. Blending of the large particles and the small particles can further improve an energy density of the material and prolong a service life of a battery.

In existing mainstream large-and-small-particle blending processes, separate sintering is required in preparation of the large particles and the small particles, that is, a large-particle precursor is mixed with a lithium source and an additive, and sintering, post-treatment, coating (doping) and secondary sintering are performed to obtain the finished large particles; and a small-particle precursor is mixed with a lithium source and an additive, and sintering, post-treatment, coating (doping) and secondary sintering are performed to obtain the finished small particles.

Therefore, the existing large-and-small-particle blending process has a long preparation time and is complex; and the productivity is limited by apparent density of a material and thus is low, and a preparation cost is high.

In view of this, the present disclosure is particularly proposed.

SUMMARY

An object of the present disclosure is to provide a blended ternary positive-electrode material, a preparation method thereof and a lithium ion battery, which are intended to improve uniformity of primary particles and improve an electrical performance of the material.

The disclosure is implemented as follows.

In a first aspect, the present disclosure provides a preparation method of a blended ternary positive-electrode material, including:

mixing a large-particle-size precursor with a lithium source, performing presintering to obtain a first presintered material, mixing a small-particle-size precursor with a lithium source, and performing presintering to obtain a second presintered material;

mixing the first presintered material with a binder, then performing compacting and puncturing to obtain a first to-be-sintered material block, mixing the second presintered material with a binder, then performing compacting and puncturing to obtain a second to-be-sintered material block, and loading the first to-be-sintered material block and the second to-be-sintered material block into a sagger together for primary sintering, wherein a loading mode for the primary sintering is selected from a first loading mode and a second loading mode; in the first loading mode, the first to-be-sintered material block is a material block with a central notch, and the second to-be-sintered material block is placed at the central notch of the first to-be-sintered material block during loading, so as to fill the central notch; in the second loading mode, the first to-be-sintered material block and the second to-be-sintered material block are material blocks with the same sectional shape and size, the second to-be-sintered material block is placed at a lower layer, and the first to-be-sintered material block is placed at an upper layer;

molecular formulas of the large-particle-size precursor and the small-particle-size precursor are both $LiNi_xM-n_yCo_zO_2$ (x+y+z=1; x=0.82-0.84; y=0.05-0.07; z=0.10-0.12), the large-particle-size precursor has a particle size D50 of 8-12 μm, and the small-particle-size precursor has a particle size D50 of 2-8 μm.

In an optional embodiment, the first to-be-sintered material block and the second to-be-sintered material block have a mass ratio of 2-3:1; when the first to-be-sintered material block and the second to-be-sintered material block are prepared, the binder and the corresponding presintered material have a mass ratio of 1-3:100.

In an optional embodiment, each of the first to-be-sintered material block and the second to-be-sintered material block has a compaction density of 2.0-3.0 g/cm$^3$ and a porosity of 30-40%.

In an optional embodiment, the sagger includes a rectangular bottom support plate, a plurality of through holes are provided in the bottom support plate, and no fence is provided on a periphery of the bottom support plate;

for a sagger with a length and width of 320-340 mm and a thickness of 10-20 mm, a total sagger loading quantity of the first to-be-sintered material block and the second to-be-sintered material block is 5-10 Kg, and conditions when the first loading mode and the second loading mode are adopted are respectively as follows:

when the first loading mode is adopted, the first to-be-sintered material block is a material block with a rectangular section and a central notch, the rectangular section has a length and width of 250-350 mm, the central notch is a rectangular notch, the central notch has a length and width of 90-110 mm, and the second to-be-sintered material block and the central notch have matched shapes and sizes;

when the second loading mode is adopted, both the first to-be-sintered material block and the second to-be-sintered material block are material blocks with rectangular sections, the rectangular section has a length and width of 250-350 mm, and the first to-be-sintered material block and the second to-be-sintered material block have thicknesses less than 20 mm.

In an optional embodiment, the primary sintering has a temperature of 725-740° C. and a sintering time of 10-12 h.

In an optional embodiment, the additive is added during the preparation of the first presintered material and the second presintered material, and the additive is at least one selected from $ZrO_2$, $SbO_2$, $SrCO_3$, $TiO_2$ and MgO;

during the preparation of the first presintered material and the second presintered material, a molar ratio of the precursor to the lithium source is controlled to be 1.02-1.06:1, the additive and the precursor have a mass ratio of 0.1-10:100, a presintering temperature is 500-600° C., and a presintering time is 4-6 h.

In an optional embodiment, after the primary sintering, the sintered material is crushed and then subjected to post-treatment and secondary sintering, the crushing is separation of the blocky material;

the post-treatment includes washing by water, filtering and drying which are sequentially carried out.

In an optional embodiment, the secondary sintering means that the post-treated material and a coating agent are mixed and sintered for 8-10 h at a temperature of 550-650° C.;

the coating agent is at least one selected from $Al_2O_3$, $Co_3O_4$, $H_3BO_3$, $TiO_2$ and MgO, and the coating agent and the post-treated material have a ratio of 0.2-0.5:100.

In a second aspect, the present disclosure provides a blended ternary positive-electrode material prepared using the preparation method according to any one of the preceding embodiments.

In a third aspect, the present disclosure provides a lithium ion battery prepared using the blended ternary positive-electrode material according to the foregoing embodiment.

The present disclosure has the following beneficial effects: a temperature-sensitive precursor type material is taken as a raw material; the large-particle precursor, the small-particle precursor and the lithium sources are presintered to obtain the first presintered material and the second presintered material; the presintered materials and the binders are then mixed, compacted and punctured to obtain the first to-be-sintered material block and the second to-be-sintered material block; the first to-be-sintered material block and the second to-be-sintered material block are loaded into the sagger together for primary sintering; and using a periphery-center regional mode or an upper-lower-layer distribution mode, the first presintered material is distributed at a periphery or the upper layer, and the second presintered material is distributed at a center or the lower layer. Since a temperature at the center is lower than a temperature on the periphery and a temperature at the lower layer is lower than a temperature at the upper layer in the sintering process, the material distribution mode in the present disclosure can adapt to temperature distribution, such that a large particle material is located at a high-temperature region and a small particle material is located at a low-temperature region, thus improving a uniformity degree of the primary particles, and effectively improving the electrical performance of the material.

Compared with a prior art, in the present disclosure, a layered or regional sintering technology is adopted during material mixing to realize the simultaneous sintering of large and small particles in one sagger, and a difference of a temperature field of a kiln is fully used, such that the large-particle sintered material and the small-particle sintered material having a good sintering effect are prepared while defects of the kiln are overcome, and the two sintered materials are mixed more uniformly with proceeding of subsequent processes.

BRIEF DESCRIPTION OF DRAWINGS

To describe the technical solutions in the embodiments of the present disclosure more clearly, the following briefly describes the accompanying drawings required in the embodiments. It should be understood that the following accompanying drawings show merely some embodiments of the present disclosure and therefore should not be considered as limiting the scope, and a person of ordinary skill in the art may still derive other related drawings from these accompanying drawings without creative efforts.

DETAILED DESCRIPTION

To make the objectives, technical solutions and advantages of the embodiments of the present disclosure clearer, the technical solutions in the embodiments of the present disclosure are clearly and completely described below. The embodiments in which specific conditions are not given are performed according to conventional conditions or conditions suggested by manufacturers. The reagents or instruments used in the present disclosure, the manufacturers of which are not indicated, are the commercially available conventional products.

Figure 1:
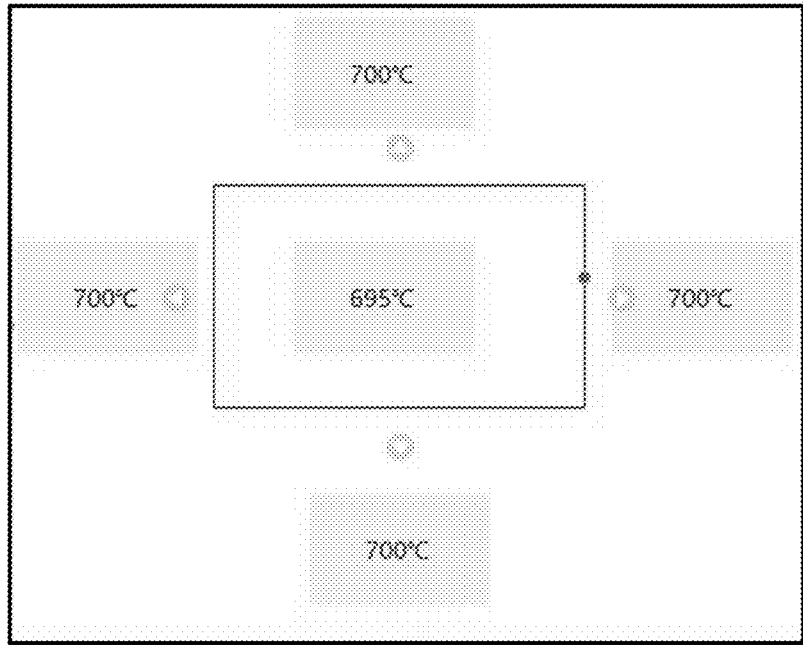
FIG. 1 is a schematic diagram of a difference of temperatures at an inner ring and an outer ring of a sagger.
Figure 2:
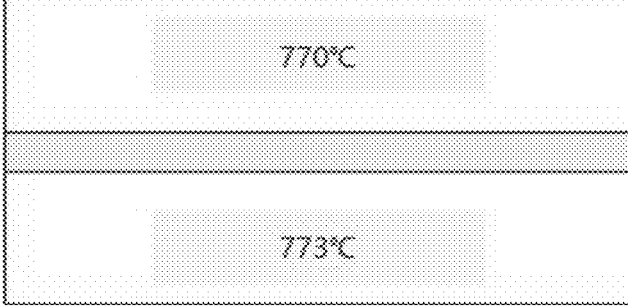
FIG. 2 is a schematic diagram of a difference of a temperature at an upper layer of the sagger.

In a sintering process of a material, due to defects of a sintering apparatus, a center and a periphery as well as an inner side and an outer side of the same sagger with the material have obvious temperature differences (as shown in FIGS. 1 and 2), and a surface temperature difference of a ternary material is about 20K, such that primary particles of the sintered material are not uniform, and a performance of the sintered material is different, such that a performance of a blended material is reduced.

The embodiment of the present disclosure provides a preparation method of a blended ternary positive-electrode material, in which a special primary sintering mode is adopted for large-and-small-particle sintering-temperature-sensitive precursors, and the inventor creatively utilizes a process of sintering large and small particles simultaneously, which exactly makes up for a difference of a temperature field in the sintering process, improves the uniformity of the primary particles and improves an electrical performance of a product. Specifically, the preparation method includes the following steps.

S1: Presintering

A large-particle-size precursor is mixed with a lithium source, presintering is performed to obtain a first presintered material, a small-particle-size precursor is mixed with a lithium source, and presintering is performed to obtain a second presintered material; and the presintering processes of the large-particle-size precursor and the small-particle-size precursor are performed separately, and process parameters are not limited.

The sintering process in the embodiment of the present disclosure is used for a temperature-sensitive high-nickel material, wherein molecular formulas of the large-particle-size precursor and the small-particle-size precursor are both $LiNi_xMn_yCo_zO_2$ (x+y+z=1; x=0.82-0.84; y=0.05-0.07; z=0.10-0.12), the large-particle-size precursor has a particle size D50 of 8-12 $\mu$m, and span=0.9-1.3 (span represents a width of particle-size distribution of the material); and the small-particle-size precursor has a particle size D50 of 2-8 $\mu$m, and span=0.9-1.3.

5

Table 1 shows differences of primary-sintering temperatures of large and small particles of different series of precursors. The high-nickel material selected by the inventor and also called as 83 nickel is sensitive to the temperature, and the difference of the sintering temperatures of the large and small particles can adapt to the temperature difference of the temperature field, in which simultaneous sintering may be performed using a temperature difference of a kiln.

TABLE 1

Differences of primary-sintering temperatures of large
and small particles of different series of precursors

| Precursor type | Large-particle primary-sintering temperature | Small-particle primary-sintering temperature | Temperature difference | Remark |
|---|---|---|---|---|
| NCM (83 nickel) | 730° C. | 722° C. | 8° C. | Temperature sensitive |
| NCM (85 nickel) | 750° C. | 720° C. | 30° C. | Temperature insensitive |
| NCM (88 nickel) | 780° C. | 750° C. | 30° C. | Temperature insensitive |

In some embodiments, additives are introduced during presintering to improve performances of the final product: additives are added during the preparation of the first presintered material and the second presintered material, the additive is at least one selected from $ZrO_2$, $SbO_2$, $SrCO_3$, $TiO_2$ and MgO, and the introduction of the above additives is favorable for improving the electrical performance of the final product.

Further, during the preparation of the first presintered material and the second presintered material, a molar ratio of the precursor to the lithium source is controlled to be 1.02-1.06:1, the additive and the precursor have a mass ratio of 0.1-10:100, a presintering temperature is 500-600° C., and a presintering time is 4-6 h. During the preparation of the first presintered material and the second presintered material, it is preferable to control the parameters within the above ranges to guarantee the performance of the final product.

S2: Primary Sintering

The first presintered material is mixed with a binder, compacting and puncturing are performed to obtain a first to-be-sintered material block, the second presintered material is mixed with a binder, compacting and puncturing are performed to obtain a second to-be-sintered material block, and the first to-be-sintered material block and the second to-be-sintered material block are loaded into a sagger together for primary sintering. The compaction sintering mode can further improve a sintering effect and speed and increase productivity, and puncturing allows the material to maintain a certain porosity, such that gas, such as carbon dioxide generated by the binder, or the like, may be rapidly discharged during sintering.

Specifically, the binder may be a general binder, such as PVA, PEC, PVP, or the like.

A loading mode for the primary sintering is selected from a first loading mode and a second loading mode, the first loading mode is a periphery-center regional distribution mode, and the second loading mode is an upper-lower layered mode. The two loading modes are well matched with temperature field distribution in the sagger, a large particle material is placed at a periphery or an upper layer, and a small particle material is placed at a center or a lower layer.

Specifically, in the first loading mode, the first to-be-sintered material block is a material block with a central notch, and the second to-be-sintered material block is placed at the central notch of the first to-be-sintered material block during loading, so as to fill the central notch. The second to-be-sintered material block may have a size just matched with a size of the central notch or slightly less than the size of the central notch.

Specifically, in the second loading mode, the first to-be-sintered material block and the second to-be-sintered material block are material blocks with the same sectional shape and size, the second to-be-sintered material block is placed at the lower layer, and the first to-be-sintered material block is placed at the upper layer. The second to-be-sintered material block is placed at the lower layer, is in contact with the sagger and is located in a low temperature region; and the first to-be-sintered material block is placed at the upper layer and located in a high temperature region. A sintering space of the kiln is further fully utilized by layered sintering, thus increasing a sagger loading quantity.

The inventor optimizes parameters of the primary sintering, and the first to-be-sintered material block and the second to-be-sintered material block have a mass ratio of 2-3:1. When the first to-be-sintered material block and the second to-be-sintered material block are prepared, the binder and the corresponding presintered material have a mass ratio of 1-3:100. Each of the first to-be-sintered material block and the second to-be-sintered material block has a compaction density of 2.0-3.0 $g/cm^3$ and a porosity of 30-40%. The primary sintering has a temperature of 725-740° C. and a sintering time of 10-12 h. By further controlling the parameters of the primary sintering, the uniformity of sintering can be improved, and a sintered material with more uniform particles can be obtained.

Specifically, the mass ratio of the first to-be-sintered material block to the second to-be-sintered material block may be 2:1, 2.5:1, 3:1, or the like, and in this range, vibration compaction can be improved, and cycling can be better. The compaction density can be 2.0 $g/cm^3$, 2.5 $g/cm^3$, 3.0 $g/cm^3$, or the like, and the porosity can be 30%, 35%, 40%, or the like.

Figure 3:
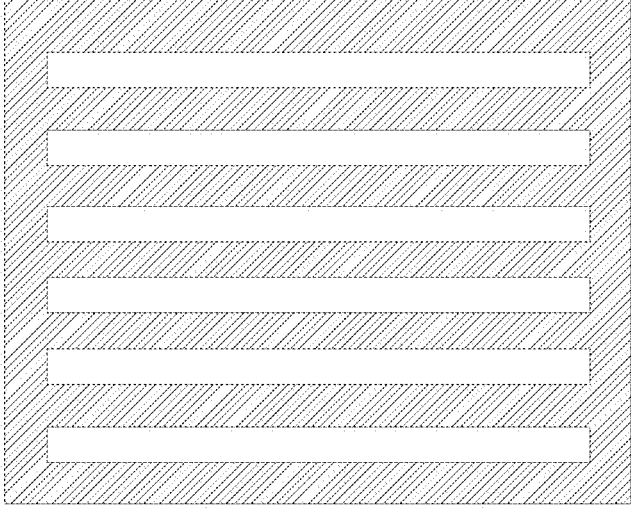
FIG. 3 is a schematic structural diagram of the sagger from a first perspective.
Figure 4:
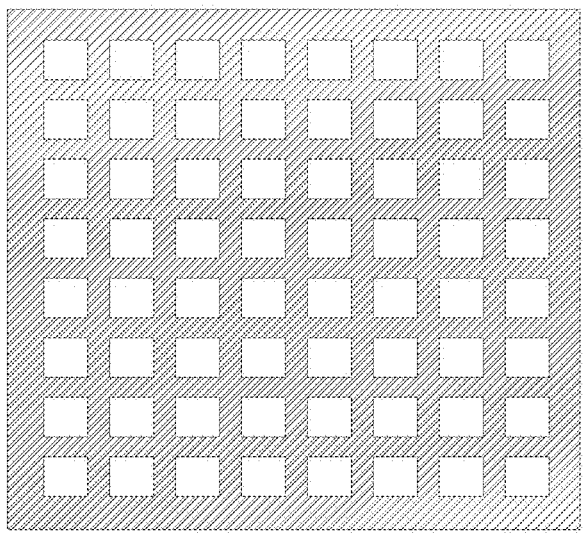
FIG. 4 is a schematic structural diagram of the sagger from a second perspective.

In some embodiments, the sagger includes a rectangular bottom support plate, a plurality of through holes are provided in the bottom support plate, and no fence is provided on a periphery of the bottom support plate. The fence-free sagger is used together with compaction sintering, and meanwhile, the regional sintering is adopted, thus further reducing a material preparation cost, and improving the performance of the product (cycle life). The fence-free sagger is of a plate-shaped structure, and the plurality of through holes are formed in the plate-shaped structure. As shown in FIGS. 3 and 4, the holes can be strip-shaped holes or square holes distributed in a matrix.

In order to realize fine control, the inventor optimizes a loading condition of the sagger with a certain size, and if the sagger has another size, adjustment is performed to scale. For a sagger with a length and width of 320-340 mm (for example, 330 mm) and a thickness of 10-20 mm, the total sagger loading quantity of the first to-be-sintered material block and the second to-be-sintered material block is 5-10 Kg, and conditions when the first loading mode and the second loading mode are adopted are respectively as follows: (1) when the first loading mode is adopted, the first to-be-sintered material block is a material block with a rectangular section and a central notch, the rectangular section has a length and width of 250-350 mm (for example, the length and the width are both 250 mm, 300 mm, 350 mm, or the like, and the length and the width can be the same or different), the central notch is a rectangular notch, the central notch has a length and width of 90-110 mm (for example, 90 mm, 100 mm, 110 mm, or the like), and the second to-be-sintered material block and the central notch have matched shapes and sizes; and thicknesses of the two material blocks can be freely superimposed according to a bearing capacity of the kiln; (2) when the second loading mode is adopted, both the first to-be-sintered material block and the second to-be-sintered material block are material blocks with rectangular sections, the rectangular section has a length and width of 250-350 mm (for example, the length and the width are both 250 mm, 300 mm, 350 mm, or the like, and the length and the width can be the same or different), the first to-be-sintered material block and the second to-be-sintered material block have thicknesses less than 20 mm, and the thickness can be freely adjusted according to the bearing capacity of the kiln and a proportion of required materials.

S3: Secondary Sintering

In an optional embodiment, after the primary sintering, the sintered material is crushed and then subjected to post-treatment and secondary sintering, and after the secondary sintering, the finished positive-electrode material is obtained.

Specifically, the crushing means that the blocky material is separated without affecting the particle size of the particles. The coarse crushing is performed by a roller crusher, and then, fine crushing is performed using a mechanical mill or another apparatus, but since the overall precursor particles have a small particle size, this crushing step does not affect the particle size of the particles.

Specifically, the post-treatment includes washing by water, filtering and drying which are sequentially carried out, and impurities on a surface can be removed by the washing and the filtering, so as to obtain a clean semi-finished positive-electrode material for secondary sintering.

Further, the secondary sintering means that the post-treated material and a coating agent are mixed and sintered for 8-10 h at a temperature of 550-650° C. The coating agent is at least one selected from $Al_2O_3$, $Co_3O_4$, $H_3BO_3$, $TiO_2$ and MgO, and the amount of the coating agent and the post-treated material have a ratio of 0.2-0.5:100. The performance of the positive-electrode material can be further improved by introducing the coating agent, and the type and the quantity of the coating agent are preferably controlled within the above range.

The embodiment of the present disclosure provides a blended ternary positive-electrode material prepared using the above preparation method, wherein the positive-electrode material contains large and small particles, particle uniformity of a positive-electrode material product can be high due to an improvement of the sintering process, the material is endowed with a more excellent electrical performance, and the positive-electrode material can be further prepared into a lithium ion battery.

The features and performances of the present disclosure are described in further detail below with reference to examples.

Example 1

The present example provided a preparation method of a blended ternary positive-electrode material, including the following steps:

(1) Precursor Selection

A molecular formula of a precursor was $LiNi_{83}Mn_{06}Co_{11}O_2$;

a large-particle precursor had a particle size D50=10 μm, and span=1.0;

a small-particle precursor had a particle size D50=5 μm, and span=1.0.

(2) Presintering

The large-particle-size precursor, lithium hydroxide as well as $ZrO_2$ and $TiO_2$ (additives, a mass ratio of $ZrO_2$ to $TiO_2$ was 1:1) were mixed and presintered to obtain a first presintered material, a molar ratio of the large-particle-size precursor to a lithium source was controlled to be 1.03:1, a mass ratio of the additives to the large-particle-size precursor was 0.4:100, a presintering temperature was 550° C., and a presintering time was 5 h.

The small-particle-size precursor, lithium hydroxide as well as $ZrO_2$ and $TiO_2$ (additives, a mass ratio of $ZrO_2$ to $TiO_2$ was 1:1) were mixed and presintered to obtain a second presintered material, a molar ratio of the small-particle-size precursor to a lithium source was controlled to be 1.03:1, a mass ratio of the additives to the small-particle-size precursor was 0.4:100, a presintering temperature was 550° C., and a presintering time was 5 h.

(3) Primary Sintering

The first presintered material and a binder PVA were mixed, compacted and punctured to obtain a first to-be-sintered material block, a mass ratio of the binder to the presintered material was 2:100, a compaction density was 2.5 g/cm³, and a porosity was 35%.

The second presintered material and a binder PVA were mixed, compacted and punctured to obtain a second to-be-sintered material block, a mass ratio of the binder to the presintered material was 2:100, a compaction density was 2.5 g/cm³, and a porosity was 35%.

The first to-be-sintered material block and the second to-be-sintered material block were loaded into a sagger together for primary sintering, and a mass ratio of the first to-be-sintered material block to the second to-be-sintered material block was 2.5:1; a temperature of the primary sintering was 732° C., and a sintering time was 11 h.

Loading mode: for a sagger with a length and width of 330 mm and a thickness of 10 mm, a total sagger loading quantity of the first to-be-sintered material block and the second to-be-sintered material block was 6 Kg, and a first loading mode was adopted for loading, wherein the first to-be-sintered material block was a material block with a rectangular section and a central notch, the rectangular section had a length and width of 300 mm, the central notch was a rectangular notch, the central notch had a length and width of 100 mm, and the second to-be-sintered material block and the central notch had matched shapes and sizes, and had the length and width of 100 mm.

(4) Secondary Sintering

After the primary sintering, the sintered material was crushed and then subjected to post-treatment and secondary sintering, and after the secondary sintering, the finished positive-electrode material was obtained. The post-treatment was washing by water, filtering and drying which were performed sequentially, and the secondary sintering meant that the post-treated material and a coating agent $Al_2O_3$ were mixed and sintered for 8 h at a temperature of 620° C.; and the coating agent and the post-treated material had a ratio of 0.3:100.

Example 2

The present example provided a preparation method of a blended ternary positive-electrode material, including the following steps:

(1) Precursor Selection

A molecular formula of a precursor was $LiNi_{83}Mn_{06}Co_{11}O_2$;

a large-particle precursor had a particle size D50=8 μm, and span=0.9;

a small-particle precursor had a particle size D50=2 μm, and span=0.9.

(2) Presintering

The large-particle-size precursor, lithium hydroxide as well as $ZrO_2$ and $TiO_2$ (additives, a mass ratio of $ZrO_2$ to $TiO_2$ was 1:1) were mixed and presintered to obtain a first presintered material, a molar ratio of the large-particle-size precursor to a lithium source was controlled to be 1.02, a mass ratio of the additives to the large-particle-size precursor was 0.1:100, a presintering temperature was 500° C., and a presintering time was 6 h.

The small-particle-size precursor, lithium hydroxide as well as $ZrO_2$ and $TiO_2$ (additives, a mass ratio of $ZrO_2$ to $TiO_2$ was 1:1) were mixed and presintered to obtain a second presintered material, a molar ratio of the small-particle-size precursor to a lithium source was controlled to be 1.02, a mass ratio of the additives to the small-particle-size precursor was 0.1:100, a presintering temperature was 500° C., and a presintering time was 6 h.

(3) Primary Sintering

The first presintered material and a binder PVA were mixed, compacted and punctured to obtain a first to-be-sintered material block, a mass ratio of the binder to the presintered material was 1:100, a compaction density was 2.0 g/cm³, and a porosity was 35%.

The second presintered material and a binder PVA were mixed, compacted and punctured to obtain a second to-be-sintered material block, a mass ratio of the binder to the presintered material was 1:100, a compaction density was 2.0 g/cm³, and a porosity was 40%.

The first to-be-sintered material block and the second to-be-sintered material block were loaded into a sagger together for primary sintering, and a mass ratio of the first to-be-sintered material block to the second to-be-sintered material block was 2:1; and a temperature of the primary sintering was 725° C., and a sintering time was 12 h.

Loading mode: for a sagger with a length and width of 330 mm and a thickness of 10 mm, a total sagger loading quantity of the first to-be-sintered material block and the second to-be-sintered material block was 5 Kg, and a first loading mode was adopted for loading, wherein the first to-be-sintered material block was a material block with a rectangular section and a central notch, the rectangular section had a length and width of 250 mm, the central notch was a rectangular notch, the central notch had a length and width of 90 mm, and the second to-be-sintered material block and the central notch had matched shapes and sizes, and had the length and width of 90 mm.

(4) Secondary Sintering

After the primary sintering, the sintered material was crushed and then subjected to post-treatment and secondary sintering, and after the secondary sintering, the finished positive-electrode material was obtained. The post-treatment was washing by water, filtering and drying which were performed sequentially, and the secondary sintering meant that the post-treated material and a coating agent $Al_2O_3$ were mixed and sintered for 10 h at a temperature of 550° C.; and the coating agent and the post-treated material had a ratio of 0.2:100.

Example 3

The present example provided a preparation method of a blended ternary positive-electrode material, including the following steps:

(1) Precursor Selection

A molecular formula of a precursor was $LiNi_{83}Mn_{06}Co_{11}O_2$;

a large-particle precursor had a particle size D50=12 μm, and span=1.3;

a small-particle precursor had a particle size D50=8 μm, and span=1.3.

(2) Presintering

The large-particle-size precursor, lithium hydroxide as well as $ZrO_2$ and $TiO_2$ (additives, a mass ratio of $ZrO_2$ to $TiO_2$ was 1:1) were mixed and presintered to obtain a first presintered material, a molar ratio of the large-particle-size precursor to a lithium source was controlled to be 1.06, a mass ratio of the additives to the large-particle-size precursor was 1.0:100, a presintering temperature was 600° C., and a presintering time was 4 h.

The small-particle-size precursor, lithium hydroxide as well as $ZrO_2$ and $TiO_2$ (additives, a mass ratio of $ZrO_2$ to $TiO_2$ was 1:1) were mixed and presintered to obtain a second presintered material, a molar ratio of the small-particle-size precursor to a lithium source was controlled to be 1.06, a mass ratio of the additives to the small-particle-size precursor was 1.0:100, a presintering temperature was 600° C., and a presintering time was 4 h.

(3) Primary Sintering

The first presintered material and a binder PVA were mixed, compacted and punctured to obtain a first to-be-sintered material block, a mass ratio of the binder to the presintered material was 3:100, a compaction density was 3.0 g/cm³, and a porosity was 35%.

The second presintered material and a binder PVA were mixed, compacted and punctured to obtain a second to-be-sintered material block, a mass ratio of the binder to the presintered material was 3:100, a compaction density was 3.0 g/cm³, and a porosity was 30%.

The first to-be-sintered material block and the second to-be-sintered material block were loaded into a sagger together for primary sintering, and a mass ratio of the first to-be-sintered material block to the second to-be-sintered material block was 3:1; and a temperature of the primary sintering was 740° C., and a sintering time was 10 h.

Loading mode: for a sagger with a length and width of 330 mm and a thickness of 10 mm, a total sagger loading quantity of the first to-be-sintered material block and the second to-be-sintered material block was 10 Kg, and a first loading mode was adopted for loading, wherein the first to-be-sintered material block was a material block with a rectangular section and a central notch, the rectangular section had a length and width of 350 mm, the central notch was a rectangular notch, the central notch had a length and width of 110 mm, and the second to-be-sintered material block and the central notch had matched shapes and sizes, and had the length and width of 110 mm.

(4) Secondary Sintering

After the primary sintering, the sintered material was crushed and then subjected to post-treatment and secondary sintering, and after the secondary sintering, the finished positive-electrode material was obtained. The post-treatment was washing by water, filtering and drying which were performed sequentially, and the secondary sintering meant that the post-treated material and a coating agent $Al_2O_3$ were mixed and sintered for 8 h at a temperature of 650° C.; and the coating agent and the post-treated material had a ratio of 0.5:100.

Example 4

The present example provided a preparation method of a blended ternary positive-electrode material, which was different from example 1 only in that: a second loading mode was adopted in step (3), both the first to-be-sintered material block and the second to-be-sintered material block were material blocks with rectangular sections, the rectangular section had a length and width of 300 mm, and parameters and quantities of the first to-be-sintered material block and the second to-be-sintered material block were unchanged.

Example 5-8

The examples provided a preparation method of a blended ternary positive-electrode material, and examples 5-8 were different from example 4 only in that: the mass ratio of the first to-be-sintered material block to the second to-be-sintered material block was 1:1, 2:1, 3:1 and 4:1.

It should be noted that in examples 4-8, thicknesses of the large-particle material blocks were slightly different due to different quantities, but all ranged from 15 mm to 20 mm; in examples 4-8, thicknesses of the small-particle material blocks were slightly different due to different quantities, but all ranged from 20 mm to 25 mm.

Comparative Example 1

The present comparative example provided a preparation method of a blended ternary positive-electrode material, which was different from example 1 only in that: in step (3), the first to-be-sintered material block and the second to-be-sintered material block were sintered under same-thickness sagger loading, separately, that is, 6 kg of the first to-be-sintered material block and 5 kg of the second to-be-sintered material block were placed into a sagger for sintering separately, and sintering temperatures (the first to-be-sintered material block was sintered at 732° C. and the second to-be-sintered material block was sintered at 727° C.) and times were consistent with those of example 1; and after sintering, the sintered materials were mixed uniformly.

Comparative Example 2

The present comparative example provided a preparation method of a blended ternary positive-electrode material, which was different from example 1 only in that: an NCM85 nickel precursor was adopted, and a molecular formula was $LiNi_xMn_yCo_zO_2$ (x+y+z=1; x=0.85; y=0.05-0.07; and z=0.08-0.10).

Comparative Example 3

The present comparative example provided a preparation method of a blended ternary positive-electrode material, which was different from example 1 only in that: an NCM88 nickel precursor was adopted, and a molecular formula was $LiNi_xMn_yCo_zO_2$ (x+y+z=1; x=0.88; y=0.05-0.07; and z=0.1-0.12).

Comparative Example 4

The present comparative example provided a preparation method of a blended ternary positive-electrode material, which was different from comparative example 1 only in that: an NCM85 nickel precursor was adopted, and a molecular formula was $LiNi_xMn_yCo_zO_2$ (x+y+z=1; x=0.85; y=0.05-0.07; and z=0.08-0.10); and the following primary-sintering temperatures were adopted: the first to-be-sintered material block was sintered at 750° C. and the second to-be-sintered material block was sintered at 720° C.

Comparative Example 5

The present comparative example provided a preparation method of a blended ternary positive-electrode material, which was different from comparative example 1 only in that: an NCM88 nickel precursor was adopted, and a molecular formula was $LiNi_xMn_yCo_zO_2$ (x+y+z=1; x=0.88; y=0.05-0.07; and z=0.1-0.12); the following primary-sintering temperatures were adopted: the first to-be-sintered material block was sintered at 740° C. and the second to-be-sintered material block was sintered at 710° C.

Test Example 1

Test Method:

(1) Manufacturing of button cell: a nickel ternary positive-electrode material, Super P and a PVDF binder were uniformly mixed according to a mass ratio of 90:5:5 in an NMP solvent to prepare slurry with a cobalt content of 45%; aluminum foil was uniformly coated with the slurry; blowing and drying were performed for 3 h at 60° C.; a pole piece was transferred into a vacuum oven at 120° C. and dried for 12 h; the dried pole piece was punched to form a circular pole piece with a diameter of 12 mm; and the pole piece was taken as a positive-electrode, Celgard 2400 was taken as a diaphragm, a metal lithium piece was taken as an anode, and an electrolyte solution was formed by dissolving 1M $LiPF_6$ as an electrolyte in a mixed electrolyte solution with EMC:DC:DMC=1:1:1, such that a button half cell was manufactured.

(2) First charging and discharging test: the button cells fabricated from the high-nickel ternary positive-electrode materials of examples 1-8 and comparative examples 1-5 were subjected to a first charging and discharging experiment, and a test method included: performing the test at 2.8-4.3V at a rate of 0.1C (a theoretical capacity was designed to be 200 mAh/g): first performing charging at 0.1C, then performing discharging at 0.1C to obtain a charging and discharging curve, and obtain a first charging and discharging capacity, results being shown in the following Table 3.

(3) High-temperature cycle performance test: the button cells fabricated from the high-nickel ternary positive-electrode materials of examples 1-8 and comparative examples 1-5 were subjected to a high-temperature (45° C.) cycle performance experiment, and a test method included: after the first charging and discharging at 2.8-4.3V at 0.1C (a nominal capacity of 200 mAh/g), performing a charging and discharging test at a rate of 1C for 50 cycles, so as to obtain a capacity retention rate after 50 high-temperature cycles, results being shown in the following Table 3.

The performances of the positive-electrode materials prepared in examples 5-8 were tested, and results were shown in Table 2.

TABLE 2

| | Large-particle sagger loading quantity | Small-particle sagger loading quantity | Blending ratio | TD g/cm³ | 0.2 C mAh/g | Cycle number/turn |
|---|---|---|---|---|---|---|
| Category | | | | | | |
| Example 5 | 3 Kg | 3 Kg | 1:1 | 2.5 | 193.6 | 600 |
| Example 6 | 4 Kg | 2 Kg | 2:1 | 2.8 | 199.6 | 1000 |
| Example 7 | 4.5 Kg | 1.5 Kg | 3:1 | 2.8 | 198.2 | 1000 |
| Example 8 | 4.8 Kg | 1.2 Kg | 4:1 | 2.6 | 194.6 | 800 |

In the above experiment, the sagger loading quantity of 6 kg was taken as a sagger loading condition, and theoretically, if the kiln supported a higher sagger loading quantity, the sagger loading quantity could be further increased, but the blending ratio of the large particles to the small particles should be controlled to be 2:1 and 3:1.

The electrical performances of the positive-electrode materials obtained in the examples and the comparative examples were tested, and results were shown in Table 3.

TABLE 3

| | 0.1CC | 0.1CD | eff | HT-Cap | HT-50cy |
|---|---|---|---|---|---|
| Example 1 | 226.7 | 208.0 | 91.8 | 205.2 | 93.2 |
| Example 2 | 228.0 | 210.5 | 92.4 | 206.9 | 93.4 |
| Example 3 | 224.4 | 208.7 | 93.0 | 206.4 | 92.8 |
| Example 4 | 229.1 | 207.8 | 90.7 | 205.2 | 93.1 |
| Example 5 | 228.5 | 211.4 | 92.5 | 209.1 | 89.1 |
| Example 6 | 226.6 | 206.8 | 91.3 | 204.2 | 92.6 |
| Example 7 | 227.3 | 207.2 | 91.2 | 204.6 | 92.2 |
| Example 8 | 226.4 | 206.9 | 91.4 | 206.3 | 93.1 |
| Comparative Example 1 | 226.7 | 205.5 | 90.7 | 205.6 | 91.3 |
| Comparative Example 2 | 234.8 | 207.2 | 88.2 | 206.6 | 91.3 |
| Comparative Example 3 | 233.7 | 214.7 | 91.9 | 211.4 | 88.7 |
| Comparative Example 4 | 234.7 | 211.6 | 90.2 | 206.8 | 93.1 |
| Comparative Example 5 | 235.7 | 211.1 | 89.6 | 208.0 | 92.0 |

0.1CC refers to a capacity of charging at a rate of 0.1C; 0.1CD refers to a capacity of discharging at a rate of 0.1C; eff refers to a ratio of the first discharge capacity to the first charge capacity at a rate of 0.1C; HT-Cap refers to a capacity of charging and discharging at a rate of 1C at a temperature of 45±5° C.; and HT-50cy refers to a capacity retention rate after charging and discharging are performed for 50 cycles at a rate of 1C at a temperature of 45±5° C.

The above description is only preferred embodiments of the present disclosure and is not intended to limit the present disclosure, and various modifications and changes may be made to the present disclosure by those skilled in the art. Any modification, equivalent replacement, or improvement made within the spirit and principle of the present disclosure shall be included in the protection scope of the present disclosure.

What is claimed is:

1. A preparation method of a blended ternary positive-electrode material, comprising:

mixing a large-particle-size precursor with a lithium source, performing presintering to obtain a first presintered material, mixing a small-particle-size precursor with a lithium source, and performing presintering to obtain a second presintered material; and mixing the first presintered material with a binder, then performing compacting and puncturing to obtain a first to-be-sintered material block, mixing the second presintered material with a binder, then performing compacting and puncturing to obtain a second to-be-sintered material block, and loading the first to-be-sintered material block and the second to-be-sintered material block into a sagger together for primary sintering, wherein a loading mode for the primary sintering is selected from a first loading mode and a second loading mode, wherein in the first loading mode, the first to-be-sintered material block is a material block with a central notch, and the second to-be-sintered material block is placed at the central notch of the first to-be-sintered material block during loading, so as to fill the central notch; and in the second loading mode, the first to-be-sintered material block and the second to-be-sintered material block are material blocks with the same sectional shape and size, wherein the second to-be-sintered material block is placed at a lower layer, and the first to-be-sintered material block is placed at an upper layer; and molecular formulas of the large-particle-size precursor and the small-particle-size precursor are both LiNi$_x$M-n$_y$Co$_z$O$_2$, wherein x+y+z=1; x=0.82-0.84; y=0.05-0.07; and z=0.10-0.12, the large-particle-size precursor has a particle size D50 of 8-12 μm, and the small-particle-size precursor has a particle size D50 of 2-8 μm.

2. The preparation method according to claim 1, wherein the first to-be-sintered material block and the second to-be-sintered material block have a mass ratio of 2-3:1; and when the first to-be-sintered material block and the second to-be-sintered material block are prepared, the binder and a corresponding presintered material have a mass ratio of 1-3:100.

3. The preparation method according to claim 2, wherein each of the first to-be-sintered material block and the second to-be-sintered material block has a compaction density of 2.0-3.0 g/cm³ and a porosity of 30-40%.

4. The preparation method according to claim 3, wherein the sagger comprises a rectangular bottom support plate, a plurality of through holes are provided in the bottom support plate, and no fence is provided on a periphery of the bottom support plate; and for a sagger with a length and a width of 320-340 mm and a thickness of 10-20 mm, a total sagger loading quantity of the first to-be-sintered material block and the second to-be-sintered material block is 5-10 Kg, and conditions when the first loading mode and the second loading mode are adopted are respectively as follows:

when the first loading mode is adopted, the first to-be-sintered material block is a material block with a rectangular section and the central notch, the rectangular section has a length and a width of 250-350 mm, the central notch is a rectangular notch, the central notch has a length and a width of 90-110 mm, and the second to-be-sintered material block and the central notch have matched shapes and sizes; and when the second loading mode is adopted, both the first to-be-sintered material block and the second to-be-sintered material block are material blocks with a rectangular section, the rectangular section has a length and a width of 250-350 mm, and the first to-be-sintered material block and the second to-be-sintered material block have thicknesses less than 20 mm.

5. The preparation method according to claim 4, wherein the primary sintering has a temperature of 725-740° C. and a sintering time of 10-12 h.

6. The preparation method according to claim 2, wherein the primary sintering has a temperature of 725-740° C. and a sintering time of 10-12 h.

7. The preparation method according to claim 3, wherein the primary sintering has a temperature of 725-740° C. and a sintering time of 10-12 h.

8. The preparation method according to claim 1, wherein the primary sintering has a temperature of 725-740° C. and a sintering time of 10-12 h.

9. The preparation method according to claim 1, wherein an additive is added during preparing the first presintered material and the second presintered material, and the additive is at least one selected from $ZrO_2$, $SbO_2$, $SrCO_3$, $TiO_2$ and MgO; and during preparing the first presintered material and the second presintered material, a molar ratio of the precursor to the lithium source is controlled to be 1.02-1.06:1, the additive and the precursor have a mass ratio of 0.1-10:100, a presintering temperature is 500-600° C., and a presintering time is 4-6 h.

10. The preparation method according to claim 1, wherein after the primary sintering, a sintered material is crushed and then subjected to post-treatment and secondary sintering, the crushing is separation of a blocky material; and the post-treatment comprises washing by water, filtering and drying which are sequentially carried out.

11. The preparation method according to claim 10, wherein the secondary sintering means that a post-treated material and a coating agent are mixed and sintered for 8-10 h at a temperature of 550-650° C., wherein the coating agent is at least one selected from $Al_2O_3$, $Co_3O_4$, $H_3BO_3$, $TiO_2$ and MgO, and the coating agent and the post-treated material have a ratio of 0.2-0.5:100.

12. A blended ternary positive-electrode material, prepared using the preparation method according to claim 1.

13. A lithium ion battery, prepared using the blended ternary positive-electrode material according to claim 12.

* * * * *